US006548787B2

(12) United States Patent
Natsuhara et al.

(10) Patent No.: US 6,548,787 B2
(45) Date of Patent: Apr. 15, 2003

(54) CERAMIC HEATER

(75) Inventors: Masuhiro Natsuhara, Itami (JP); Hirohiko Nakata, Itami (JP); Syunji Nagao, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/760,161

(22) Filed: Jan. 11, 2001

(65) Prior Publication Data

US 2001/0010310 A1 Aug. 2, 2001

(30) Foreign Application Priority Data

Jan. 13, 2000 (JP) ....................................... 2000-004570

(51) Int. Cl.[7] ............................ H05B 3/16; C04B 35/52
(52) U.S. Cl. .......................................... 219/543; 501/89
(58) Field of Search ................................ 219/543, 544, 219/546, 547, 548, 552, 553; 501/53, 87, 88, 89, 99, 100, 101, 153, 154

(56) References Cited

U.S. PATENT DOCUMENTS

| | | | | | |
|---|---|---|---|---|---|
| 4,357,526 | A | * | 11/1982 | Yamamoto et al. | 219/544 |
| 4,407,970 | A | * | 10/1983 | Komatsu et al. | 507/97.2 |
| 4,569,921 | A | * | 2/1986 | Omori et al. | 501/88 |
| 4,591,537 | A | * | 5/1986 | Aldinger et al. | 428/698 |
| 4,804,823 | A | * | 2/1989 | Okuda et al. | 219/553 |
| 5,001,089 | A | * | 3/1991 | Kasori et al. | 501/98.4 |
| 5,233,166 | A | * | 8/1993 | Maeda et al. | 219/552 |
| 5,264,681 | A | * | 11/1993 | Nozaki et al. | 219/544 |
| 5,470,806 | A | * | 11/1995 | Krstic et al. | 501/90 |
| 5,732,318 | A | | 3/1998 | Natsuhara et al. | |
| 5,997,998 | A | * | 12/1999 | Sawamura | 428/209 |
| 5,998,049 | A | * | 12/1999 | Tanaka et al. | 219/541 |
| 6,025,579 | A | * | 2/2000 | Tanaka et al. | 219/544 |

FOREIGN PATENT DOCUMENTS

| | | |
|---|---|---|
| EP | 0838734 | 4/1998 |
| EP | 0903646 | 3/1999 |
| JP | 04324276 | 11/1992 |
| JP | 9-197861 | 7/1997 |
| JP | 11095583 | 4/1999 |

* cited by examiner

*Primary Examiner*—Sang Paik
(74) *Attorney, Agent, or Firm*—W. F. Fasse; W. G. Fasse

(57) ABSTRACT

A ceramic substrate for a ceramic heater includes aluminum nitride, silicon nitride or silicon carbide as the main component for increasing mechanical strength and improving thermal shock resistance, and a proper additive for controlling thermal conductivity. A temperature gradient from a heating element to a power feeding electrode is reduced by providing a dimensional ratio of the substrate effective for preventing oxidation of a power feeding contact that contacts the electrode of the heating element formed on the surface of the ceramic substrate. The dimensional ratio $A/B \geqq 20$ is satisfied, wherein A represents the distance from the contact between a circuit of the heating element and the electrode to an end of the ceramic substrate closer to the electrode, and B represents the thickness of the ceramic substrate. The thermal conductivity of the ceramic substrate is adjusted to 30 to 80 W/m·K.

24 Claims, 1 Drawing Sheet

CERAMIC HEATER

BACKGROUND OF THE INVENTION

1. Field of the Invention

The present invention relates to a ceramic heater having a heating element formed on a ceramic substrate (hereinafter simply referred to as a substrate), and more particularly, it relates to a ceramic heater usefully applied to an electric or electronic apparatus.

2. Description of the Prior Art

In general, ceramics having an excellent insulation property and a high degree of freedom in design of a heater circuit is applied to various types of heater substrates. In particular, an alumina sintered body, having high mechanical strength among ceramic materials with thermal conductivity reaching 30 W/m·K, relatively excellent in thermal conductivity and thermal shock resistance and obtained at a low cost, is widely employed. When the alumina sintered body is applied to a A substrate, however, the substrate cannot follow abrupt temperature change of a heating element and may be broken due to a thermal shock.

Japanese Patent Laying-Open No. 4-324276 (1992) discloses a ceramic heater employing aluminum nitride having thermal conductivity of at least 160 W/m·K. A substrate having such a degree of thermal conductivity is not broken by abrupt temperature change dissimilarly to the substrate of alumina. This gazette describes that the uniform heating property of the overall heater can be secured by stacking about four layers of aluminum nitride and forming heating elements having different shapes on the respective layers while locating an electrode substantially at the center of the substrate for uniformizing temperature distribution in the ceramic heater.

Japanese Patent Laying-Open No. 9-197861 (1997) discloses employment of aluminum nitride for a substrate of a heater for a fixing device. According to this prior art, a substrate having thermal conductivity of at least 50 W/m·K, preferably at least 200 W/m·K can be obtained by setting the mean particle diameter of aluminum nitride particles to not more than 6.0 μm, optimizing combination of sintering agents and performing sintering at a temperature of not more than 1800° C., preferably not more than 1700° C. This gazette describes that the substrate having excellent thermal conductivity is employed for the heater for a fixing device thereby efficiently transferring heat of a heating element to paper or toner and improving a fixing rate.

In addition, Japanese Patent Laying-Open No. 11-95583 (1999) discloses the use of silicon nitride for a substrate of a heater for a fixing device. This prior art reduces the thickness of the substrate itself by employing silicon nitride having a relatively high strength with a flexural strength of 490 to 980 N/mm$^2$ and a thermal conductivity of at least 40 W/m·K, preferably at least 80 W/m·K, and reducing the heat capacity thereof, thereby reducing the power consumption. This gazette describes that silicon nitride has a lower thermal conductivity than aluminum nitride and hence the heat of a heating element is not readily transmitted to a connector of a current feeding part and oxidation of an electrode of the heating element can be prevented for avoiding a contact failure.

When thermal conductivity of a substrate is increased, the quantity of diffusion to parts other than a heating part is also increased although heat propagation efficiency from a heating element is improved, to consequently increase power consumption. In order to prevent oxidation of a contact between an electrode of the heating element and a connector of a feeding part, therefore, it is effective that a uniform heating property around the substrate is excellent and a temperature around the electrode of the heating element is lower by at least several % than that of the heating element region.

SUMMARY OF THE INVENTION

An object of the present invention is to provide a ceramic heater having an increased mechanical strength of a substrate and an improved thermal shock resistance.

Another object of the present invention is to provide a ceramic heater capable of controlling the thermal conductivity of a substrate and reducing the steepness of a temperature gradient from a heating element to an electrode thereby preventing oxidation of a contact between the electrode of the heating element and a connector of a current feeding part.

In a ceramic heater according to the present invention, a ceramic substrate provided with an electrode and a heating element on its surface is formed in a shape satisfying $A/B \geqq 20$ assuming that A represents the distance from a contact between the heating element and the electrode to an end of the substrate closer to the electrode and B represents the thickness of the substrate, and the thermal conductivity of the substrate is adjusted to 30 to 80 W/m·K.

The main component forming the substrate is aluminum nitride, silicon nitride or silicon carbide, and a subsidiary component having thermal conductivity of not more than 50 W/m·K is added thereto.

If the main component of the ceramic is aluminum nitride, 5 to 100 parts by weight of aluminum oxide, 1 to 20 parts by weight of silicon and/or a silicon compound in terms of silicon dioxide or 5 to 100 parts by weight of zirconium and/or a zirconium compound in terms of zirconium oxide is added to 100 parts by weight of aluminum nitride, in order to adjust thermal conductivity thereof.

In order to obtain a ceramic sintered body having high mechanical strength, 1 to 10 parts by weight of an alkaline earth element and/or a rare earth element of the periodic table is introduced as a sintering agent with respect to 100 parts by weight of aluminum nitride. Calcium (Ca) is preferably selected as the alkaline earth element of the periodic table, while neodymium (Nd) or ytterbium (Yb) are preferably selected as the rare earth element of the periodic table.

The material for the substrate of the ceramic heater according to the present invention is preferably mainly composed of aluminum nitride (AlN), silicon nitride ($Si_3N_4$) or silicon carbide (SiC). While a substrate having thermal conductivity exceeding 100 W/m·K can be obtained by sintering material powder of such ceramic with addition of not more than several % of a proper sintering agent, the thermal conductivity of the substrate can be reduced to 30 to 80 W/m·K by adding a subsidiary component having thermal conductivity of not more than 50 W/m·K to the material powder.

If the thermal conductivity of the substrate is less than 30 W/m·K, there is a high possibility that the substrate itself is unpreferably broken by a thermal shock due to abrupt temperature increase of the heating element as energized. If the thermal conductivity of the substrate exceeds 80 W/m·K, the heat of the heating element is propagated to the overall substrate to unpreferably increase the quantity of diffusion to parts other than a heating part while also increasing power consumption, although a uniform heating property is excellent.

When adding aluminum oxide ($Al_2O_3$) to aluminum nitride (AlN), it is preferable to add 5 to 100 parts by weight of the former with respect to 100 parts by weight of the latter. The added aluminum oxide solidly dissolves oxygen in aluminum nitride in the sintered body thereby reducing the thermal conductivity while aluminum oxide having thermal conductivity of about 20 W/m·K itself is present in a grain boundary phase of aluminum nitride to effectively reduce the thermal conductivity of the ceramic sintered body. If the content of aluminum oxide is less than 5 parts by weight, the thermal conductivity may exceed 80 W/m·K. If the content of aluminum oxide exceeds 100 parts by weight, aluminum nitride reacts with aluminum oxide to form aluminum oxynitride. This substance has extremely low thermal conductivity, and hence the thermal conductivity of the overall substrate may be less than 30 W/m·K in this case.

Silicon and/or a silicon compound can be added to aluminum nitride (AlN) for adjusting the thermal conductivity. Silicon dioxide ($SiO_2$), silicon nitride ($Si_3N_4$) or silicon carbide (SiC) may be employed as the added silicon compound. Such a substance is present in a grain boundary phase in the sintered body, and serves as a thermal barrier phase inhibiting thermal conduction between aluminum nitride particles. Such silicon and/or a silicon compound is preferably added by 1 to 20 parts by weight in terms of silicon dioxide ($SiO_2$) with respect to 100 parts by weight of aluminum nitride. If the content of silicon and/or a silicon compound is less than 1 part by weight, the thermal barrier effect of silicon tends to be insufficient and hence the thermal conductivity may exceed 80 W/m·K. If the content of silicon and/or a silicon compound exceeds 20 parts by weight, the thermal conductivity tends to be less than 30 W/m·K.

Zirconium and/or a zirconium compound can be added to aluminum nitride (AlN) for adjusting the thermal conductivity. A typical example is zirconium oxide ($ZrO_2$). This substance is present in a grain boundary phase in the sintered body and serves as a thermal barrier phase inhibiting thermal conduction between aluminum nitride particles. 5 to 100 parts by weight of zirconium oxide is preferably added with respect to 100 parts by weight of aluminum nitride. If the content of zirconium oxide is less than 5 parts by weight, the thermal barrier effect of zirconium tends to be insufficient and hence the thermal conductivity may exceed 80 W/m·K. If the content of zirconium exceeds 100 parts by weight, the thermal conductivity tends to be less than 30 W/m·K.

Titanium oxide, vanadium oxide, manganese oxide or magnesium oxide can also be added as another subsidiary component, in order to reduce the thermal conductivity of aluminum nitride. 15 to 30 parts by weight of titanium oxide, 5 to 20 parts by weight of vanadium oxide, 5 to 10 parts by weight of manganese oxide or 5 to 15 parts by weight of magnesium oxide is preferably added with respect to 100 parts by weight of aluminum nitride.

Also when the ceramic is mainly composed of silicon nitride ($Si_3N_4$), aluminum oxide, zirconium oxide, titanium oxide, vanadium oxide, manganese oxide or magnesium oxide can be added for adjusting thermal conductivity. 2 to 20 parts by weight of aluminum oxide, 5 to 20 parts by weight of zirconium oxide, 10 to 30 parts by weight of titanium oxide, 5 to 20 parts by weight of vanadium oxide, 5 to 10 parts by weight of manganese oxide or 10 to 20 parts of magnesium oxide is preferably added with respect to 100 parts by weight of silicon nitride.

When the ceramic is mainly composed of silicon carbide (SiC), aluminum oxide, zirconium oxide, titanium oxide, vanadium oxide, manganese oxide or magnesium oxide can be added for adjusting thermal conductivity. 10 to 40 parts by weight of aluminum oxide, 5 to 20 parts by weight of zirconium oxide, 15 to 30 parts by weight of titanium oxide, 10 to 25 parts by weight of vanadium oxide, 2 to 10 parts by weight of manganese oxide or 5 to 15 parts of magnesium oxide is preferably added with respect to 100 parts by weight of silicon carbide.

When the main component is prepared from aluminum nitride (AlN) in the present invention, at least 1 part by weight of an alkaline earth element and/or a rare earth element of the periodic table is preferably introduced as a sintering agent with respect to 100 parts by weight of material powder of the main component, in order to obtain a dense sintered body. The alkaline earth element of the periodic table is preferably calcium (Ca), while the rare earth element of the periodic table is preferably neodymium (Nd) or ytterbium (Yb). Sintering can be performed at a relatively low temperature by adding such element(s), for reducing the sintering cost.

According to the present invention, the sintering body may be prepared by a well-known method. For example, an organic solvent, a binder etc. may be added to a prescribed quantity of material powder for preparing a slurry through a mixing step in a ball mill, forming the slurry into a sheet of a prescribed thickness by the doctor blade method, cutting the sheet into a prescribed size/shape, degreasing the cut sheet in the atmosphere or in nitrogen, and thereafter sintering the sheet in a non-oxidizing atmosphere.

The slurry can be formed through general means such as pressing or extrusion molding. In order to prepare the heater, the heating element can be formed in a prescribed pattern by sintering a layer of a high melting point metal consisting of tungsten or molybdenum on the sintered body by a technique such as screen printing in a non-oxidizing atmosphere. The electrode serving as a feeding part for the heating element can also be simultaneously formed by screen-printing the same on the sintered body. In this case, however, degreasing must be performed in a non-oxidizing atmosphere of nitrogen or the like in order to prevent oxidation of a metallized layer. Further, Ag or Ag—Pd can be employed as the heating element. While Examples of the present invention are described with reference to ceramic heaters for soldering irons, the present invention is not restricted to this application.

In the ceramic heater according to the present invention, the thermal conductivity of the substrate is adjusted to 30 to 80 W/m·K and the relation between the distance A from the contact between the heating element and the electrode on the substrate to the end of the substrate closer to the electrode and the thickness B of the substrate is set to satisfy $A/B \geqq 20$, thereby increasing mechanical strength of the substrate, improving thermal shock resistance, relaxing or reducing a temperature gradient from the heating element to the electrode, inhibiting oxidation of the contact of the electrode part and preventing a contact failure.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

EXAMPLE 1

In each sample, the quantity of aluminum oxide ($Al_2O_3$) added to 100 parts by weight of aluminum nitride (AlN) forming the main component of ceramic was selected as shown in Table 1, while 2 parts by weight of $Yb_2O_3$, 2 parts by weight of $Nd_2O_3$ and 0.3 parts by weight of CaO were added as sintering agents with addition of an organic solvent and a binder, and these materials were mixed in a ball mill for 24 hours. A slurry obtained in this manner was formed into a sheet by the doctor blade method so that the thickness after sintering was 0.7 mm.

Figure 1:
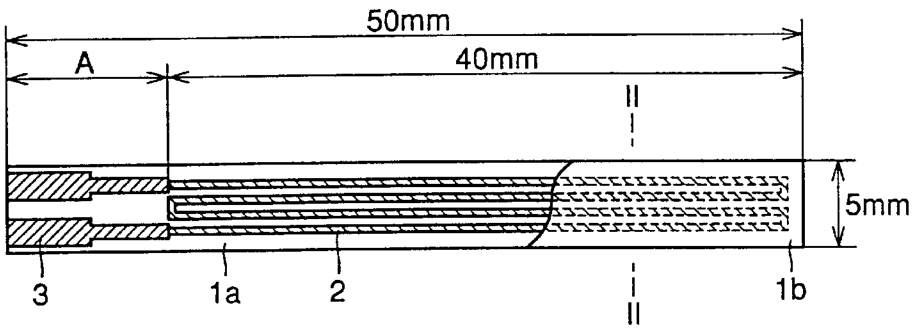
FIG. 1 is a plan view of a ceramic heater according to the present invention.

The sheet was cut so that the dimensions of both substrates 1*a* and 1*b* shown in a plan view of a ceramic heater in FIG. 1 were 50 mm by 5 mm after sintering, and degreased in the atmosphere at 500° C. Then, the degreased body was sintered in a nitrogen atmosphere at 1800° C., and thereafter polished into a thickness (B) of 0.5 mm. Further, a heating element 2 and an electrode 3 were screen-printed on the substrate 1*a* with Ag—Pd paste and Ag paste respectively, and sintered in the atmosphere at 880° C. As to the size/shape of the ceramic heater, the longitudinal length of the circuit of the heating element 2 was set to 40 mm for satisfying the condition $A/B \geqq 20$ assuming that A represents the distance from the contact between the heating element 2 and the electrode 3 to an end of the substrate 1*a* closer to the electrode 3 and B represents the thickness of the substrate 1*a*.

Figure 2:
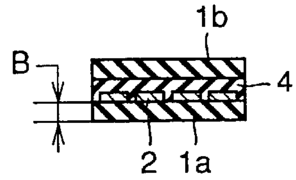
FIG. 2 is a sectional view of the ceramic heater taken along the line II—II in FIG. 1.
Figure 3:
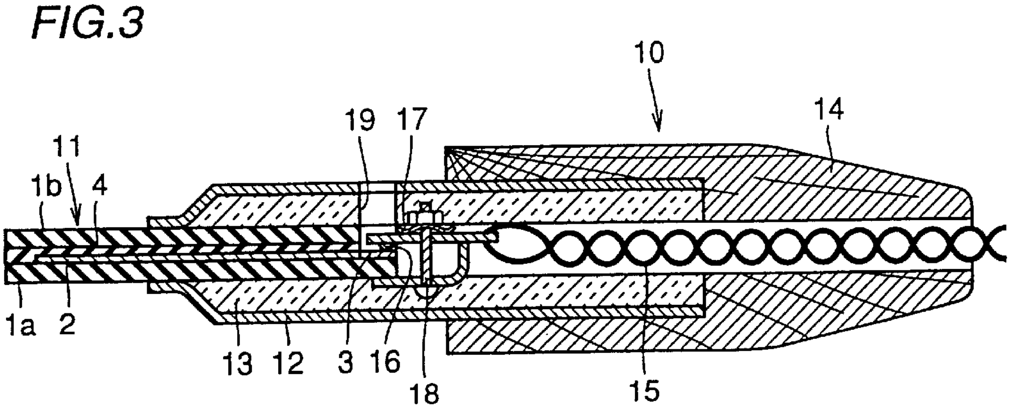
FIG. 3 is a sectional view of a heater for a soldering iron according to the present invention.

Further, pasty sealing glass 4 was applied in order to protect the heating element 2 as shown in FIG. 2, the substrate 1*b* of 45 mm by 5 mm was placed thereon and sintered in the atmosphere at 880° C. for bonding the substrates 1*a* and 1*b* to each other, thereby preparing a heater for a soldering iron 10 shown in a sectional view of FIG. 3. The substrates 1*a* and 1*b*, made of ceramic, are identical in size and material to each other except slight difference between the total lengths thereof. Table 1 shows values of thermal conductivity in Example 1 measured by applying a laser flash method to the substrate 1*a*.

On the forward end of the soldering iron 10, a frame 12 of a metal thin plate holds a tip 11 consisting of the substrates 1*a* and 1*b*. A heat insulator 13 consisting of mica or asbestos is interposed between the frame 12 and the tip 11, while a wooden handle 14 is engaged with the outer periphery of the frame 12. In order to connect the electrode 3 with a lead wire 15, a contact 16 on the side of the lead wire 15 is brought into pressure contact with the electrode 3 by a spring seat 17 and a clamp bolt 18 for attaining mechanical contact bonding since a deposited metal such as solder is readily thermally deteriorated. If the temperature is repeatedly increased beyond 300° C. in the atmosphere, the contact 16 is oxidized to readily cause a contact failure. Numeral 19 denotes a window for observing the temperature of the part of the electrode 3.

While the material for the tip 11 of the soldering iron 10 is generally prepared from copper due to excellent affinity with solder and high thermal conductivity, adhesion of solder is readily caused due to the excellent affinity with solder. When the tip 11 must not be covered with solder in a specific application, therefore, the material therefor is prepared from ceramic. The solder, which is prepared from an alloy of tin and lead while the melting point thereof is reduced as the content of tin is increased, is generally welded at a temperature of about 230 to 280° C. A toner fixing temperature of a heater for a fixing device is 200 to 250° C.

The quantity of current was adjusted with a sliding voltage regulator so that the temperature of a portion of the soldering iron 10 where the tip 11 was exposed was stabilized at 300° C., for measuring power consumption. At the same time, the current temperature of the part of the electrode 3 was measured with an infrared radiation thermometer through the window 19 for temperature observation. Table 1 also shows the results.

TABLE 1

| Sample No. | Content of $Al_2O_3$ (parts by weight) | Thermal Conductivity (W/m · K) | Temperature of Electrode Part (° C.) | Power Consumption at 300° C. (W) |
|---|---|---|---|---|
| ☆1 | 0 | 148 | 232 | 120 |
| ☆2 | 4 | 99 | 241 | 105 |
| 3 | 5 | 80 | 273 | 80 |
| 4 | 10 | 72 | 277 | 75 |
| 5 | 25 | 50 | 281 | 73 |
| 6 | 70 | 37 | 283 | 70 |
| 7 | 100 | 30 | 285 | 68 |
| ☆8 | 120 | 20 | — | substrate cracked upon energization |

Marks ☆ denote comparative examples.

Referring to Table 1, power consumption increased in samples Nos. 1 and 2 having thermal conductivity exceeding the upper limit of the present invention, while a crack similar to a quenching crack frequently observed in earthenware was caused in the substrate 1*a* of a sample No. 8 having thermal conductivity less than the lower limit due by to a thermal shock. The temperature gradient of the part of the electrode 3 with respect to the heating element 2 was not severe within the range of thermal conductivity recommended in the present invention, to indicate that the uniform heating property of the substrate 1*a* is excellent.

EXAMPLE 2

In each sample, the quantities of silicon dioxide ($SiO_2$), silicon nitride ($Si_3N_4$) and silicon carbide (SiC) added to 100 parts by weight of aluminum nitride (AlN) forming the main component of ceramic were selected as shown in Table 2, while 2 parts by weight of $Yb_2O_3$, 2 parts by weight of $Nd_2O_3$ and 0.3 parts by weight of CaO were added as sintering agents for preparing a substrate by a method similar to that in Example 1. The substrate was assembled into the soldering iron 10 shown in FIG. 3, and the characteristics of the substrate serving as a ceramic heater were evaluated through a procedure similar to that in Example 1. Table 2 also shows the results.

TABLE 2

| Sample No. | Additive | Content in Terms of $SiO_2$ (parts by weight) | Thermal Conductivity (W/m · K) | Temperature of Electrode Part (° C.) | Power Consumption at 300° C. (W) |
|---|---|---|---|---|---|
| ☆9 | $SiO_2$ | 0.5 | 120 | 237 | 111 |
| ☆10 | $Si_3N_4$ | 0.5 | 131 | 235 | 115 |
| ☆11 | SiC | 0.5 | 118 | 238 | 108 |
| 12 | $SiO_2$ | 1.0 | 75 | 276 | 72 |
| 13 | $Si_3N_4$ | 1.0 | 79 | 275 | 75 |
| 14 | SiC | 1.0 | 74 | 277 | 72 |
| 15 | $SiO_2$ | 5.0 | 63 | 279 | 70 |
| 16 | $Si_3N_4$ | 10.0 | 58 | 280 | 68 |
| 17 | $SiO_2$ | 15.0 | 41 | 281 | 65 |
| 18 | SiC | 20.0 | 32 | 285 | 63 |
| 19 | $SiO_2$ | 20.0 | 33 | 284 | 63 |
| ☆20 | $SiO_2$ | 25.0 | 24 | — | substrate cracked upon energization |
| ☆21 | $Si_3N_4$ | 25.0 | 27 | — | substrate cracked upon energization |

Marks ☆ denote comparative examples.

Referring to Table 2, the thermal conductivity was adjusted in the proper range and the power consumption was suppressed in samples Nos. 12 to 19 having contents of additives in terms of $SiO_2$ within the range recommended in the present invention. The temperature gradient of the part of the electrode 3 with respect to the heating element 2 also exhibited a stable uniform heating property.

EXAMPLE 3

In each sample, the quantity of zirconium dioxide ($ZrO_2$) added to 100 parts by weight of aluminum nitride (AlN) forming the main component of ceramic was selected as shown in Table 3, while 2 parts by weight of $Yb_2O_3$, 2 parts by weight of $Nd_2O_3$ and 0.3 parts by weight of CaO were added as sintering agents for preparing a substrate by a method similar to that in Example 1. Table 3 shows results of characteristics of the substrate serving as a ceramic heater for the soldering iron 10 shown in FIG. 3 evaluated through a procedure similar to that in Example 1.

TABLE 3

| Sample No. | Content of $ZrO_2$ (parts by weight) | Thermal Conductivity (W/m · K) | Temperature of Electrode Part (° C.) | Power Consumption at 300° C. (W) |
|---|---|---|---|---|
| ☆22 | 4 | 104 | 238 | 113 |
| 23 | 5 | 77 | 275 | 78 |
| 24 | 10 | 70 | 278 | 72 |
| 25 | 25 | 65 | 280 | 71 |
| 26 | 70 | 45 | 282 | 69 |
| 27 | 100 | 32 | 284 | 68 |

TABLE 3-continued

| Sample No. | Content of $ZrO_2$ (parts by weight) | Thermal Conductivity (W/m · K) | Temperature of Electrode Part (° C.) | Power Consumption at 300° C. (W) |
|---|---|---|---|---|
| ☆28 | 120 | 19 | — | substrate cracked upon energization |

Marks ☆ denote comparative examples.

Referring to Table 3, the thermal conductivity was adjusted in the proper range and the power consumption was suppressed in samples Nos. 23 to 27 having contents of zirconium oxide ($ZrO_2$) within the range recommended in the present invention. The temperature gradient of the part of the electrode 3 with respect to the heating element 2 also exhibited a stable uniform heating property.

EXAMPLE 4

In each sample, the quantities of aluminum oxide ($Al_2O_3$), zirconium oxide ($ZrO_2$), titanium dioxide ($TiO_2$), vanadium oxide ($V_2O_5$), manganese dioxide ($MnO_2$) and magnesium oxide (MgO) added to 100 parts by weight of silicon nitride ($Si_3N_4$) forming the main component of ceramic were selected as shown in Table 4, while 10 parts by weight of yttrium oxide was added as a sintering agent for forming a sheet by a method similar to that in Example 1. Thereafter the sheet was degreased in a nitrogen atmosphere at 850° C., and sintered in a nitrogen atmosphere of 1850° C. for three hours thereby preparing each substrate shown in Table 4. Table 4 also shows results of characteristics of the substrate serving as a ceramic heater for the soldering iron 10 shown in FIG. 3 evaluated through a procedure similar to that in Example 1.

TABLE 4

| Sample No. | Additive | Content (parts by weight) | Thermal Conductivity (W/m · K) | Temperature of Electrode Part (° C.) | Power Consumption at 300° C. (W) |
|---|---|---|---|---|---|
| ☆29 | — | — | 100 | 239 | 111 |
| 30 | $Al_2O_3$ | 2 | 79 | 273 | 80 |
| 31 | $Al_2O_3$ | 5 | 52 | 280 | 73 |
| 32 | $Al_2O_3$ | 10.0 | 41 | 283 | 71 |
| 33 | $Al_2O_3$ | 20.0 | 31 | 284 | 69 |
| ☆34 | $Al_2O_3$ | 30.0 | 15 | — | substrate cracked upon energization |
| 35 | $ZrO_2$ | 5.0 | 75 | 274 | 80 |

TABLE 4-continued

| Sample No. | Additive | Content (parts by weight) | Thermal Conductivity (W/m · K) | Temperature of Electrode Part (° C.) | Power Consumption at 300° C. (W) |
|---|---|---|---|---|---|
| 36 | $ZrO_2$ | 10.0 | 51 | 281 | 74 |
| 37 | $ZrO_2$ | 20.0 | 35 | 284 | 72 |
| ☆38 | $ZrO_2$ | 30.0 | 19 | — | substrate cracked upon energization |
| 39 | $TiO_2$ | 10.0 | 74 | 275 | 78 |
| 40 | $TiO_2$ | 30.0 | 45 | 282 | 72 |
| ☆41 | $TiO_2$ | 50.0 | 26 | — | substrate cracked upon energization |
| 42 | $V_2O_5$ | 10.0 | 72 | 275 | 80 |
| 43 | $V_2O_5$ | 20.0 | 43 | 285 | 72 |
| ☆44 | $V_2O_5$ | 30.0 | unsinterable | — | — |
| 45 | $MnO_2$ | 5.0 | 69 | 277 | 77 |
| 46 | $MnO_2$ | 10.0 | 35 | 285 | 71 |
| ☆47 | $MnO_2$ | 20.0 | 23 | — | substrate cracked upon energization |
| 48 | MgO | 10.0 | 74 | 274 | 80 |
| 49 | MgO | 20.0 | 53 | 279 | 75 |
| ☆50 | MgO | 30.0 | 23 | — | substrate cracked upon energization |

Marks ☆ denote comparative examples.

Referring to Table 4, the thermal conductivity was adjusted in the proper range and the power consumption was suppressed in samples Nos. 30 to 33, 35 to 37, 39 and 40, 42 and 43, 45 and 46 and 48 and 49 having contents of the additives within the range recommended in the present invention. The temperature gradient of the part of the electrode 3 with respect to the heating element 2 also exhibited a stable uniform heating property.

EXAMPLE 5

In each sample, the quantities of aluminum oxide ($Al_2O_3$), zirconium oxide ($ZrO_2$), titanium dioxide ($TiO_2$), vanadium oxide ($V_2O_5$), manganese dioxide ($MnO_2$) and magnesium oxide (MgO) added to 100 parts by weight of silicon carbide (SiC) forming the main component of ceramic were selected as shown in Table 5, while 1.0 part by weight of boron carbide ($B_4C$) was added as a sintering agent for forming a sheet by a method similar to that in Example 1. Thereafter the sheet was degreased in a nitrogen atmosphere at 850° C., and sintered in an argon atmosphere of 2000° C. for three hours thereby preparing each substrate shown in Table 5. Table 5 also shows results of characteristics of the substrate serving as a ceramic heater for the soldering iron 10 shown in FIG. 3 evaluated through a procedure similar to that in Example 1.

TABLE 5

| Sample No. | Additive | Content (parts by weight) | Thermal Conductivity (W/m · K) | Temperature of Electrode Part (° C.) | Power Consumption at 300° C. (W) |
|---|---|---|---|---|---|
| ☆51 | — | — | 162 | 221 | 132 |
| 52 | $Al_2O_3$ | 10.0 | 79 | 269 | 82 |
| 53 | $Al_2O_3$ | 20.0 | 61 | 275 | 77 |
| 54 | $Al_2O_3$ | 30.0 | 46 | 280 | 72 |
| 55 | $Al_2O_3$ | 40.0 | 32 | 285 | 69 |
| ☆56 | $Al_2O_3$ | 50.0 | 16 | — | substrate cracked upon energization |
| 57 | $ZrO_2$ | 5.0 | 74 | 271 | 83 |
| 58 | $ZrO_2$ | 10.0 | 49 | 279 | 76 |
| 59 | $ZrO_2$ | 20.0 | 33 | 285 | 73 |
| ☆60 | $ZrO_2$ | 30.0 | 17 | — | substrate cracked upon energization |
| 61 | $TiO_2$ | 15.0 | 78 | 269 | 82 |
| 62 | $TiO_2$ | 30.0 | 48 | 280 | 76 |
| ☆63 | $TiO_2$ | 50.0 | 26 | — | substrate cracked upon energization |
| 64 | $V_2O_5$ | 10.0 | 69 | 272 | 79 |
| 65 | $V_2O_5$ | 25.0 | 39 | 283 | 71 |
| ☆66 | $V_2O_5$ | 40.0 | 18 | — | substrate cracked upon energization |
| 67 | $MnO_2$ | 2.0 | 77 | 270 | 83 |
| 68 | $MnO_2$ | 10.0 | 42 | 282 | 71 |
| ☆69 | $MnO_2$ | 20.0 | 21 | — | substrate cracked upon energization |
| 70 | MgO | 5.0 | 70 | 270 | 82 |

TABLE 5-continued

| Sample No. | Additive | Content (parts by weight) | Thermal Conductivity (W/m · K) | Temperature of Electrode Part (° C.) | Power Consumption at 300° C. (W) |
|---|---|---|---|---|---|
| 71 | MgO | 15.0 | 51 | 278 | 77 |
| ☆72 | MgO | 30.0 | 24 | — | substrate cracked upon energization |

Marks ☆ denote comparative examples.

Referring to Table 5, the thermal conductivity was adjusted in the proper range and the power consumption was suppressed in samples Nos. 52 to 55, 57 to 59, 61 and 62, 64 and 65, 67 and 68 and 70 and 71 having contents of the additives within the range recommended in the present invention. The temperature gradient of the part of the electrode 3 with respect to the heating element 2 also exhibited a stable uniform heating property.

EXAMPLE 6

In each sample, the quantities of titanium dioxide ($TiO_2$), vanadium oxide ($V_2O_5$), manganese dioxide ($MnO_2$) and magnesium oxide (MgO) added to 100 parts by weight of aluminum nitride (AlN) forming the main component of ceramic were selected as shown in Table 6, while 2 parts by weight of $Yb_2O_3$, 2 parts by weight of $Nd_2O_3$ and 0.3 parts by weight of CaO were added as sintering agents for preparing a substrate by a method similar to that in Example 1. Table 6 also shows results of characteristics of the substrate serving as a ceramic heater for the soldering iron 10 shown in FIG. 3 evaluated through a procedure similar to that in Example 1.

TABLE 6

| Sample No. | Additive | Content (parts by weight) | Thermal Conductivity (W/m · K) | Temperature of Electrode Part (° C.) | Power Consumption at 300° C. (W) |
|---|---|---|---|---|---|
| ☆73 | $TiO_2$ | 5.0 | 123 | 235 | 112 |
| 74 | $TiO_2$ | 15.0 | 74 | 275 | 77 |
| 75 | $TiO_2$ | 30.0 | 40 | 282 | 73 |
| ☆76 | $TiO_2$ | 50.0 | 23 | — | substrate cracked upon energization |
| 77 | $V_2O_5$ | 5.0 | 70 | 278 | 74 |
| 78 | $V_2O_5$ | 20.0 | 36 | 283 | 70 |
| ☆79 | $V_2O_5$ | 40.0 | 17 | 271 | substrate cracked upon energization |
| 80 | $MnO_2$ | 5.0 | 71 | 277 | 74 |
| 81 | $MnO_2$ | 10.0 | 47 | 285 | 73 |
| ☆82 | $MnO_2$ | 20.0 | 22 | — | substrate cracked upon energization |
| 83 | MgO | 5.0 | 67 | 279 | 73 |
| 84 | MgO | 15.0 | 49 | 281 | 72 |
| ☆85 | MgO | 30.0 | 18 | — | substrate cracked upon energization |

Marks ☆ denote comparative examples

Referring to Table 6, the thermal conductivity was adjusted in the proper range and the power consumption was suppressed in samples Nos. 74 and 75, 77 and 78, 80 and 81 and 83 and 84 having contents of the additives within the range recommended in the present invention. The temperature gradient of the part of the electrode 3 with respect to the heating element 2 also exhibited a stable uniform heating property.

EXAMPLE 7

Substrates similar to that shown in FIG. 1 were formed by samples Nos. 2a, 2b and 2c prepared by adding 4 parts by weight of aluminum oxide ($Al_2O_3$) to 100 parts by weight of aluminum nitride (AlN) forming the main component of ceramic, samples Nos. 5a, 5b and 5c prepared by adding 25 parts by weight of aluminum oxide ($Al_2O_3$) to 100 parts by weight of aluminum nitride, samples Nos. 15a, 15b and 15c prepared by adding 5 parts by weight of silicon dioxide ($SiO_2$) to 100 parts by weight of aluminum nitride and samples Nos. 25a, 25b and 25c prepared by adding 25 parts by weight of zirconium oxide ($ZrO_2$) to 100 parts by weight of aluminum nitride while setting distances A from starting points of circuits of heating elements 2 to ends of substrates 1*a* closer to electrodes 3 to 5 mm, 10 mm 10 and 20 mm respectively. Each substrate was assembled into the soldering iron 10 shown in FIG. 3, and the characteristics of the substrate serving as a ceramic heater were evaluated through a procedure similar to that in Example 1. Table 7 also shows the results.

TABLE 7

| Sample No. | Thermal Conductivity (W/m · K) | Distance A to End of Substrate (mm) | A/B | Temperature of Electrode Part (° C.) | Power Consumption at 300° C. (W) |
|---|---|---|---|---|---|
| 2a | ☆99 | ☆5 | 10 | 272 | 113 |
| 2b | ☆99 | 10 | 20 | 241 | 105 |

TABLE 7-continued

| Sample No. | Thermal Conductivity (W/m · K) | Distance A to End of Substrate (mm) | A/B | Temperature of Electrode Part (° C.) | Power Consumption at 300° C. (W) |
|---|---|---|---|---|---|
| 2c | ☆99 | 20 | 40 | 182 | 97 |
| 5a | 50 | ☆5 | 10 | 290 | 104 |
| 5b | 50 | 10 | 20 | 281 | 73 |
| 5c | 50 | 20 | 40 | 262 | 52 |
| 15a | 63 | ☆5 | 10 | 280 | 101 |
| 15b | 63 | 10 | 20 | 279 | 70 |
| 15c | 63 | 20 | 40 | 258 | 49 |
| 25a | 65 | ☆5 | 10 | 290 | 102 |
| 25b | 65 | 10 | 20 | 280 | 71 |
| 25c | 65 | 20 | 40 | 270 | 50 |

Marks ☆ denote comparative examples

When gradually increasing the distance A from the starting point of the circuit of the heating element to the end of the substrate closer to the electrode while keeping the length of the substrate constant, the circuit of the heating element is shortened and hence power consumption is reduced as a matter of course. Referring to Table 7, power consumption is excessive in the samples 2a, 2b and 2c having thermal conductivity exceeding the upper limit of the range recommended in the present invention although the temperature of the electrode part does not reach a temperature region facilitating oxidation of the part of the electrode. Similarly, power consumption is excessive in the samples 5a, 15a and 25a not satisfying the relation $A/B \geqq 20$ between the distance A to the end of the substrate and the thickness B of the substrate. As to the remaining samples, the temperature gradient from the heating element to the part of the electrode is low and power consumption is suppressed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A ceramic heater comprising:

a ceramic substrate including a surface and having a certain thickness and an overall thermal conductivity;

a heating element having a circuit formed on the surface of said ceramic substrate; and an electrode formed on the surface of said ceramic substrate and connected to said circuit of said heating element; wherein:

A and B satisfy a relational expression $A/B \geqq 20$ wherein A represents a distance from a contact between said circuit of said heating element and said electrode to an edge of said ceramic substrate closer to said electrode and B represents said certain thickness of said ceramic substrate;

the overall thermal conductivity of said ceramic substrate is at least 30 W/m·K and not more than 80 W/m·K; and said ceramic substrate is formed of a material that contains a main component of at least one material selected from a group consisting of aluminum nitride, silicon nitride and silicon carbide and a subsidiary component having a subsidiary component thermal conductivity of not more than 50 W/m·K.

2. The ceramic heater according to claim 1, wherein the material forming said ceramic substrate contains 100 parts by weight of aluminum nitride as said main component and at least 5 parts by weight and not more than 100 parts by weight of aluminum oxide added as said subsidiary component.

3. The ceramic heater according to claim 1, wherein the material forming said ceramic substrate contains 100 parts by weight of aluminum nitride as said main component and at least either silicon or a silicon compound of at least 1 part by weight and not more than 20 parts by weight in terms of silicon dioxide added as said subsidiary component.

4. The ceramic heater according to claim 1, wherein the material forming said ceramic substrate contains 100 parts by weight of aluminum nitride as said main component and at least either zirconium or a zirconium compound of at least 5 parts by weight and not more than 100 parts by weight in terms of zirconium oxide added as said subsidiary component.

5. The ceramic heater according to claim 1, wherein the material forming said ceramic substrate contains 100 parts by weight of aluminum nitride as said main component and at least 15 parts by weight and not more than 30 parts by weight of titanium oxide added as said subsidiary component.

6. The ceramic heater according to claim 1, wherein the material forming said ceramic substrate contains 100 parts by weight of aluminum nitride as said main component and at least 5 parts by weight and not more than 20 parts by weight of vanadium oxide added as said subsidiary component.

7. The ceramic heater according to claim 1, wherein the material forming said ceramic substrate contains 100 parts by weight of aluminum nitride as said main component and at least 5 parts by weight and not more than 10 parts by weight of manganese dioxide added as said subsidiary component.

8. The ceramic heater according to claim 1, wherein the material forming said ceramic substrate contains 100 parts by weight of aluminum nitride as said main component and at least 5 parts by weight and not more than 15 parts by weight of magnesium oxide added as said subsidiary component.

9. The ceramic heater according to claim 1, wherein the material forming said ceramic substrate contains 100 parts by weight of aluminum nitride as said main component and at least 1 part by weight and not more than 10 parts by weight of at least either an alkaline earth element or a rare earth element of the periodic table added as a sintering agent.

10. The ceramic heater according to claim 9, wherein said sintering agent comprises said alkaline earth element, which is calcium.

11. The ceramic heater according to claim 9, wherein said sintering agent comprises said rare earth element, which is neodymium or ytterbium.

12. The ceramic heater according to claim 1, wherein the material forming said ceramic substrate contains 100 parts by weight of silicon nitride as said main component and at least 2 parts by weight and not more than 20 parts by weight of aluminum oxide added as said subsidiary component.

13. The ceramic heater according to claim 1, wherein the material forming said ceramic substrate contains 100 parts by weight of silicon nitride as said main component and at least 5 parts by weight and not more than 20 parts by weight of zirconium oxide added as said subsidiary component.

14. The ceramic heater according to claim 1, wherein the material forming said ceramic substrate contains 100 parts by weight of silicon nitride as said main component and at least 10 parts by weight and not more than 30 parts by weight of titanium oxide added as said subsidiary component.

15. The ceramic heater according to claim 1, wherein the material forming said ceramic substrate contains 100 parts by weight of silicon nitride as said main component and at least 5 parts by weight and not more than 20 parts by weight of vanadium oxide added as said subsidiary component.

16. The ceramic heater according to claim 1, wherein the material forming said ceramic substrate contains 100 parts by weight of silicon nitride as said main component and at least 5 parts by weight and not more than 10 parts by weight of manganese dioxide added as said subsidiary component.

17. The ceramic heater according to claim 1, wherein the material forming said ceramic substrate contains 100 parts by weight of silicon nitride as said main component and at least 10 parts by weight and not more than 20 parts by weight of magnesium oxide added as said subsidiary component.

18. The ceramic heater according to claim 1, wherein the material forming said ceramic substrate contains 100 parts by weight of silicon carbide as said main component and at least 10 parts by weight and not more than 40 parts by weight of aluminum oxide added as said subsidiary component.

19. The ceramic heater according to claim 1, wherein the material forming said ceramic substrate contains 100 parts by weight of silicon carbide as said main component and at least 5 parts by weight and not more than 20 parts by weight of zirconium oxide added as said subsidiary component.

20. The ceramic heater according to claim 1, wherein the material forming said ceramic substrate contains 100 parts by weight of silicon carbide as said main component and at least 15 parts by weight and not more than 30 parts by weight of titanium oxide added as said subsidiary component.

21. The ceramic heater according to claim 1, wherein the material forming said ceramic substrate contains 100 parts by weight of silicon carbide as said main component and at least 10 parts by weight and not more than 25 parts by weight of vanadium oxide added as said subsidiary component.

22. The ceramic heater according to claim 1, wherein the material forming said ceramic substrate contains 100 parts by weight of silicon carbide as said main component and at least 2 parts by weight and not more than 10 parts by weight of manganese dioxide added as said subsidiary component.

23. The ceramic heater according to claim 1, wherein the material forming said ceramic substrate contains 100 parts by weight of silicon carbide as said main component and at least 5 parts by weight and not more than 15 parts by weight of magnesium oxide added as said subsidiary component.

24. A ceramic heater comprising:

a ceramic substrate having a surface, a plurality of edges adjoining said surface, and a thickness perpendicular to said surface;

a heating element disposed on said surface of said ceramic substrate; and an electrode disposed on said surface of said ceramic substrate, connected to said heating element at a connection point, and extending from said connection point to a first edge of said ceramic substrate among said plurality of edges;

wherein $A/B \geqq 20$, where A is a distance from said connection point to said first edge of said ceramic substrate and B is said thickness of said ceramic substrate; and wherein said ceramic substrate consists of a ceramic material comprising a main ceramic component and a subsidiary component that are blended together in such proportions that said ceramic substrate has a thermal conductivity of at least 30 W/m·K and not more than 80 W/m·K.

* * * * *